(12) United States Patent
Watanabe

(10) Patent No.: US 10,825,455 B2
(45) Date of Patent: Nov. 3, 2020

(54) VOICE DIALOGUE APPARATUS, VOICE DIALOGUE METHOD, AND NON-TRANSITORY COMPUTER READABLE MEDIA

(71) Applicant: TOYOTA JIDOSHA KABUSHIKI KAISHA, Toyota-shi (JP)

(72) Inventor: Narimasa Watanabe, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 176 days.

(21) Appl. No.: 16/181,524

(22) Filed: Nov. 6, 2018

(65) Prior Publication Data
US 2019/0164550 A1 May 30, 2019

(30) Foreign Application Priority Data
Nov. 28, 2017 (JP) ................................ 2017-228235

(51) Int. Cl.
| | | |
|---|---|---|
| G10L 15/22 | (2006.01) | |
| G06F 40/56 | (2020.01) | |
| G06F 40/268 | (2020.01) | |
| G10L 15/28 | (2013.01) | |

(52) U.S. Cl.
CPC ............ *G10L 15/22* (2013.01); *G06F 40/268* (2020.01); *G06F 40/56* (2020.01); *G10L 15/28* (2013.01); *G10L 2015/225* (2013.01)

(58) Field of Classification Search
USPC .................................... 704/251, 231, 1–504
See application file for complete search history.

(56) References Cited

U.S. PATENT DOCUMENTS

| | | | |
|---|---|---|---|
| 9,653,078 B2 * | 5/2017 | Watanabe | ............... G10L 15/00 |
| 10,573,307 B2 * | 2/2020 | Skantze | .................. G10L 15/22 |
| 2009/0210411 A1 * | 8/2009 | Murata | ............... G10L 15/1822 |

(Continued)

FOREIGN PATENT DOCUMENTS

| | | |
|---|---|---|
| JP | 2009-193448 | 8/2009 |
| JP | 2016-024384 | 2/2016 |

(Continued)

*Primary Examiner* — Marcus T Riley
(74) *Attorney, Agent, or Firm* — Oblon, McClelland, Maier & Neustadt, L.L.P.

(57) ABSTRACT

A voice dialogue apparatus analyzes an acquired user's voice, generates a parrot-like response sentence and outputs the generated parrot-like response sentence. The voice dialogue apparatus includes storage means for storing the user's past voice, average calculation means for calculating an average value of voice sentence lengths each indicating a length of the user's voice based on the user's past voice, candidate generation means for combining a dependency word, which establishes a dependency relation with a noun included in the acquired user's voice, with the noun to generate a plurality of response sentence candidates, and repetition generation means for selecting, in association with the average value of the voice sentence lengths, one response sentence candidate from among the plurality of response sentence candidates and using the selected response sentence candidate as it is or processing the selected response sentence candidate to generate the parrot-like response sentence.

7 Claims, 2 Drawing Sheets

(56) References Cited

U.S. PATENT DOCUMENTS

| | | | |
|---|---|---|---|
| 2016/0042749 A1* | 2/2016 | Hirose | G10L 15/22 |
| | | | 704/270.1 |
| 2018/0122377 A1* | 5/2018 | Skantze | G10L 25/48 |
| 2019/0164550 A1* | 5/2019 | Watanabe | G06F 40/56 |

FOREIGN PATENT DOCUMENTS

| | | |
|---|---|---|
| JP | 2016-36500 | 3/2016 |
| JP | 2016-80980 A | 5/2016 |
| JP | 2016-80981 A | 5/2016 |

\* cited by examiner

VOICE DIALOGUE APPARATUS, VOICE DIALOGUE METHOD, AND NON-TRANSITORY COMPUTER READABLE MEDIA

CROSS REFERENCE TO RELATED APPLICATIONS

This application is based upon and claims the benefit of priority from Japanese patent application No. 2017-228235, filed on Nov. 28, 2017, the disclosure of which is incorporated herein in its entirety by reference.

BACKGROUND

The present disclosure relates to a voice dialogue apparatus, a voice dialogue method, and a program for dialoguing with a user.

A voice dialogue apparatus that analyzes a user's voice, generates a parrot-like response sentence for repeating the voice based on a result of the analysis, and outputs the generated parrot-like response sentence is known (e.g., see Japanese Unexamined Patent Application Publication No. 2009-193448).

The above voice dialogue apparatus distinguishes a template corresponding to the user's voice and generates the parrot-like response sentence having a length associated with the template. For this reason, the length of the generated parrot-like response sentence is limited by the template. Thus, the length of the generated parrot-like response sentence may deviate from a length of a sentence in the user's voice. In light of such circumstances, there is a demand for a voice dialogue apparatus capable of generating a parrot-like response sentence according to a user's voice.

SUMMARY

The present disclosure has been made to solve such a problem. A main object of the present disclosure is to provide a voice dialogue apparatus, a voice dialogue method, and a program capable of generating a parrot-like response sentence having a sentence length corresponding to a user's voice.

An example aspect of the present disclosure to achieve the above object is a voice dialogue apparatus for analyzing an acquired user's voice, generating a parrot-like response sentence for repeating the voice based on a result of the analysis, and outputting the generated parrot-like response sentence. The voice dialogue apparatus includes: storage means for storing the user's past voice; average calculation means for calculating an average value of voice sentence lengths each indicating a length of the user's voice based on the user's past voice stored in the storage means; candidate generation means for combining a dependency word, which establishes a dependency relation with a noun included in the acquired user's voice, with the noun to generate a plurality of response sentence candidates; and repetition generation means for selecting one response sentence candidates from among the plurality of response sentence candidates generated by the candidate generation means and using the selected response sentence candidate as it is or processes the selected response sentence candidate to generate the parrot-like response sentence.

Another example aspect of the present disclosure to achieve the above object is a voice dialogue apparatus for analyzing an acquired user's voice, generating a parrot-like response sentence for repeating the voice based on a result of the analysis, and outputting the generated parrot-like response sentence. The voice dialogue apparatus includes: storage means for storing the user's past voice; average calculation means for calculating an average value of voice sentence lengths each indicating a length of the user's voice based on the user's past voice stored in the storage means; candidate generation means for combining a dependency word, which establishes a dependency relation with a noun included in the acquired user's voice, with the noun to generate a plurality of response sentence candidates; and repetition generation means for selecting, in association with the average value of the voice sentence lengths which is calculated by the average calculation means, the response sentence candidate including a preset number of dependency words from among the plurality of response sentence candidates generated by the candidate generation means, adding the dependency word to the selected response sentence candidate or deleting the dependency word from the selected response sentence candidate to generate a final response sentence candidate so that a sentence length of the final response sentence candidate becomes close to the average value of the voice sentence lengths calculated by the average calculation means, and using the final response sentence candidate as it is or processing the final response sentence candidate to generate the parrot-like response sentence.

In this example aspect, the repetition generation means may select the response sentence candidate having the voice sentence length closest to the average value of the voice sentence length calculated by the average calculation means from among the plurality of response sentence candidates generated by the candidate generation means.

In this example aspect, the candidate generation means may extract a predicate term included in the acquired user's voice and concatenates at least one dependency word, which establishes the dependency relation with the noun included in the extracted predicate term, to the extracted predicate term to generate a plurality of patterns of the response sentence candidates.

In this example aspect, the repetition generation means may generate the parrot-like response sentence by adding a preset additional word to the selected response sentence candidate.

Another example aspect of the present disclosure to achieve the above object is a voice dialogue method for analyzing an acquired user's voice, generating a parrot-like response sentence for repeating the voice based on a result of the analysis, and outputting the generated parrot-like response sentence. The voice dialogue method includes: storing the user's past voice; calculating an average value of voice sentence lengths each indicating a length of the user's voice based on the stored user's past voice; combining words included in the acquired user's voice to generate a plurality of response sentence candidates; and selecting, in association with the calculated average value of the voice sentence lengths, one response sentence candidates from among the generated plurality of response sentence candidates and using the selected response sentence candidate as it is or processing the selected response sentence candidate to generate the parrot-like response sentence.

Another example aspect of the present disclosure to achieve the above object is a program for analyzing an acquired user's voice, generating a parrot-like response sentence for repeating the voice based on a result of the analysis, and outputting the generated parrot-like response sentence. The program causes a computer to execute; a process of calculating an average value of voice sentence lengths each indicating a length of the user's voice based on the stored user's past voice; a process of combining a dependency word, which establishes a dependency relation with a noun included in the acquired user's voice, with the noun to generate a plurality of response sentence candidates; and a process of selecting, in association with the calculated average value of the voice sentence lengths, one response sentence candidates from among the generated plurality of response sentence candidates and using the selected response sentence candidate as it is or processing the selected response sentence candidate to generate the parrot-like response sentence.

The present disclosure can provide a voice dialogue apparatus, a voice dialogue method, and a program capable of generating a parrot-like response sentence having a sentence length corresponding to a user's voice.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Hereinafter, embodiments of the present disclosure will be described with reference to the drawings.

Figure 1:
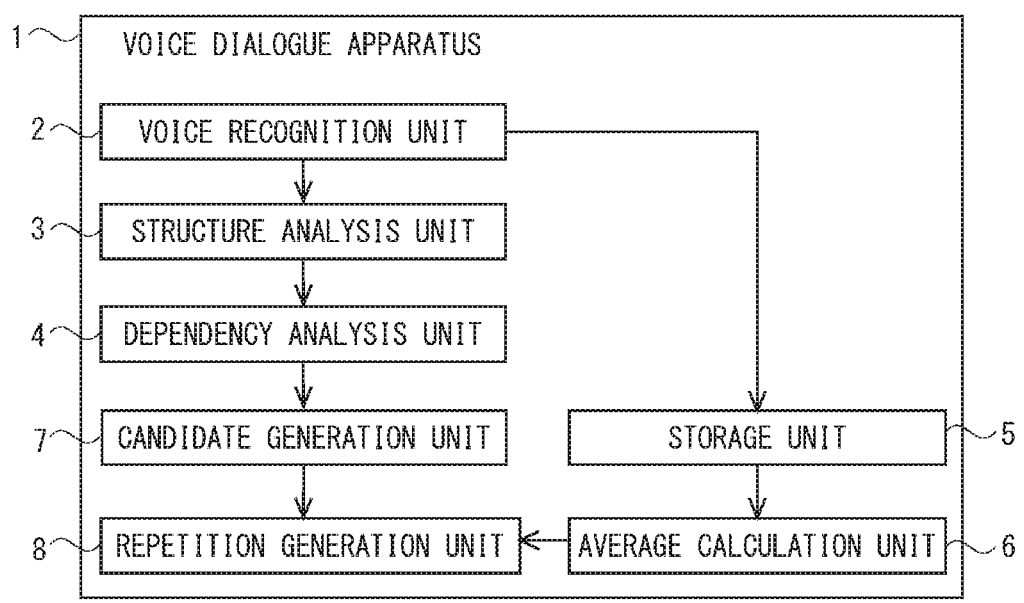
FIG. 1 is a block diagram showing a schematic system configuration of a voice dialogue apparatus according to a first embodiment of the present disclosure.

FIG. 1 is a block diagram showing a schematic system configuration of a voice dialogue apparatus according to a first embodiment of the present disclosure. The voice dialogue apparatus 1 according to the first embodiment analyzes an acquired user's voice, generates a parrot-like response sentence for repeating the voice based on a result of the analysis, and outputs the generated parrot-like response sentence.

In a dialogue with the user, the voice dialogue apparatus 1 outputs the above parrot-like response sentence to fill the time in until an actual response is generated. This reduces an unnatural impression in the dialogue caused by waiting for a response. The voice dialogue apparatus 1 is mounted on, for example, a robot, a server, a terminal such as a PC, and a mobile terminal such as a smartphone. The voice dialogue apparatus 1 can achieve more natural dialogues with the user.

The voice dialogue apparatus 1 according to the first embodiment includes a voice recognition unit 2 that recognizes the user's voice, a structure analysis unit 3 that analyzes a structure of the voice, an dependency analysis unit 4 that analyzes a dependency relation, a storage unit 5, an average calculation unit 6 that calculates an average value of the user's voice sentence lengths, a candidate generation unit 7 that generates response sentence candidates, and a repetition generation unit 8 that generates the parrot-like response sentence.

Figure 2:
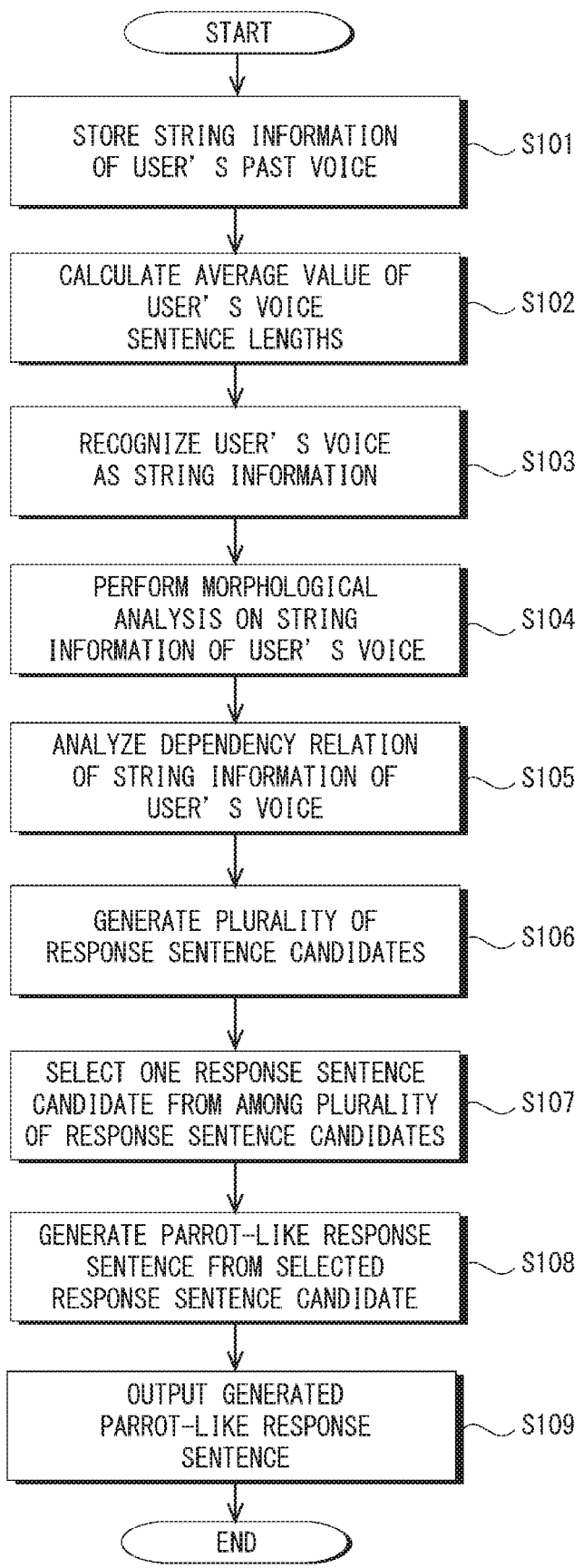
FIG. 2 is a flowchart showing an example of a flow of a voice dialogue method according to the first embodiment of the present disclosure.

Note that a main hardware configuration of the voice dialogue apparatus 1 includes a microcomputer composed of, for example, a CPU (Central Processing Unit) that performs calculation processing etc., a memory composed of a ROM (Read Only Memory) and a RAM (Random Access Memory) storing a calculation program executed by the CPU, a control program, etc., and an interface unit (I/F) that inputs and outputs signals to and from the outside (FIG. 2). The CPU, the memory, and the interface unit are connected to one another through a data bus or the like.

The voice recognition unit 2 performs voice recognition processing based on the user's voice information acquired by a microphone or the like, converts the user's voice information into text, and recognizes it as string information. The voice recognition unit 2 performs the voice recognition by detecting an utterance section from the user's voice information output from the microphone, and performing pattern matching on the voice information in the detected utterance section with reference to a statistical language model or the like.

The statistical language model is, for example, a probability model for calculating an appearance probability of a language expression such as an appearance distribution of a word, and a distribution of a word appearing after a certain word. The statistical language model is a concatenation probability learned for each morpheme. The statistical language model is stored in, for example, the storage unit 5 in advance. The voice recognition unit 2 generates morpheme information with parts-of-speech information (noun, adjective, verb, adverb, etc.), which is obtained by adding the parts-of-speech type to each morpheme of the user's voice information. The voice recognition unit 2 outputs the string information of the recognized user's voice to the structure analysis unit 3.

The structure analysis unit 3 analyzes a structure of the voice information recognized by the voice recognition unit 2. For example, the structure analysis unit 3 performs morphological analysis on the string information indicating the user's voice information, which has been voice-recognized by means of a common morphological analyzer, and interprets the meaning of the string information. The structure analysis unit 3 outputs a result of the analysis of the string information to the dependency analysis unit 4.

The dependency analysis unit 4 analyzes a dependency relation of the string information based on the result of the analysis of the string information of the user's voice output from the structure analysis unit 3. The dependency analysis unit 4 analyzes the dependency relation of the string information of, for example, "I dropped precious money earned by working for a month" and then extracts a noun "money" in a predicate term "dropped money", which is a basic term, and modifiers "precious", "earned", "by working", and "for a month" that are in the dependency relation with the noun "money".

Incidentally, an intended usage of the parrot-like response is to fill the time in until an actual response sentence is generated in a dialogue with the user. Thus, many parrot-like responses have been processed simply. However, in a dialogue such as chatting, the parrot-like response is a fine response and plays an important role in making a dialogue more natural. In particular, the sentence length of the parrot-like response greatly influences a tempo of a dialogue. Thus, it is more preferable to make the parrot-like response having an appropriate sentence length corresponding to a sentence length of the user's voice. Under such circumstances, there is a demand for a voice dialogue apparatus capable of generating the parrot-like response sentence having the sentence length corresponding to the sentence length of the user's voice and outputting it.

To that end, the voice dialogue apparatus 1 according to the first embodiment calculates the average value of the voice sentence lengths indicating the sentence lengths of the user's voices based on the user's past voices stored in the storage unit 5, combines a dependency word, which establishes a dependency relation with a noun included in the acquired user's voice, with the noun to generate a plurality of response sentence candidates, associates the generated response sentence candidates with the calculated average value of the voice sentence lengths, selects one response sentence candidate from among the plurality of response sentence candidates, and uses the selected response sentence candidate as it is or processes the selected response sentence to generate the parrot-like response sentence.

In this manner, the parrot-like response sentence having the appropriate sentence length corresponding to the average sentence length of the user's past voices can be generated. That is, the parrot-like response sentence having the sentence length corresponding to the user's voice can be generated.

The storage unit 5 is one specific example of storage means. The storage unit 5 is composed of, for example, a memory. The storage unit 5 stores, for example, a plurality of user's voices (utterances) in the past dialogues. The storage unit 5 stores the string information (e.g., text information) of a plurality of the user's past voices which have been subjected to the voice recognition processing by the voice recognition unit 2. The storage unit 5 may store the user's voices in the past dialogues in advance or may sequentially store the user's voices during dialogues with the user.

The average calculation unit 6 is a specific example of the average calculation means. The average calculation unit 6 calculates the average value of the voice sentence lengths based on the string information of the plurality of the user's past voices stored in the storage unit 5. The user's voice sentence length indicates a length of the user's voice sentence. The average value of the sentence lengths of the user's voices indicates an average length of the user's voices sentences. Thus, when the parrot-like response sentence is generated according to the average value of the user's voice sentence lengths, the parrot-like response sentence having the appropriate sentence length according to the user's voice sentence length can be generated. The average value of the voice sentence lengths is, for example, an average number of characters and words included in the user's voice. The average calculation unit 6 outputs the calculated average value of the user's voice sentence lengths to the repetition generation unit 8.

The candidate generation unit 7 is a specific example of candidate generation means. The candidate generation unit 7 combines the dependency word, which establishes the dependency relation with the noun included in the acquired user's voice, with the noun to generate the plurality of response sentence candidates based on the dependency relation output from the dependency analysis unit 4.

The candidate generation unit 7 extracts, for example, the predicate term from the string information of the user's voice. The candidate generation unit 7 generates the response sentence candidate by concatenating a word having the dependency relation with the noun included in the extracted predicate term to the extracted predicate term. By doing so, it is possible to concatenate phrases that have the dependency relation with the noun in the predicate to the noun to generate the response sentence candidate using the noun. Therefore, it is possible to reduce selections of incomplete phrases and generate appropriate response sentence candidates.

The candidate generation unit 7 concatenates at least one word (hereinafter referred to as the dependency word) having the dependency relation with the noun included in the extracted predicate term to the extracted predicate term in order to generate a plurality of patterns of the response sentence candidates. The number of dependency words concatenated to the predicate term and the concatenation method may be set in the candidate generation unit 7 in advance.

The candidate generation unit 7 may gradually increase the number of dependency words concatenated to the predicate term to generate the plurality of patterns of the response pattern candidates in such a way that the voice sentence lengths of the plurality of the response sentence candidates gradually increase. By doing so, it is possible to easily generate the plurality of patterns of the response sentence candidates having the voice sentence lengths different from one another in stages. The candidate generation unit 7 may use the extracted predicate term as it is as the response sentence candidate.

The candidate generation unit 7 may concatenate one of the dependency words to the extracted predicate term as appropriate in order to generate the plurality of patterns of the response sentence candidates within a preset upper limit value. In this manner, various response sentence candidates can be generated within a limited range.

More specifically, the candidate generation unit 7 extracts the predicate term "dropped money" from the string information "I dropped precious money earned by working for a month". The candidate generation unit 7 concatenates the words "for a month", "by working", "earned", and "precious" that establish the dependency relation with the noun "money" to the extracted predicate term "dropped money" in order to generate the response sentence candidates such as "dropped precious money", "dropped money earned by working", and "dropped precious money earned" in stages. Alternatively, the candidate generation unit 7 uses the extracted predicate term "dropped money" as it is as the response sentence candidate. The candidate generation unit 7 outputs the generated plurality of response sentence candidates to the repetition generation unit 8.

The repetition generation unit 8 is a specific example of repetition generation means. The repetition generation unit 8 selects one response sentence candidate from among the plurality of response sentence candidates generated by the candidate generation unit 7 in association with the average value of the voice sentence lengths calculated by the average calculation unit 6.

The repetition generation unit 8 selects, for example, the response sentence candidate having the voice sentence length closest to the average value of the voice sentence length calculated by the average calculation unit 6 from among the plurality of response sentence candidates generated by the candidate generation unit 7. In this way, the response sentence candidate having the appropriate sentence length according to the average value of the user's past voice sentence lengths can be selected.

The repetition generation unit 8 extracts, from among the plurality of response sentence candidates generated by the candidate generation unit 7, for example, a plurality of response sentence candidates having voice sentence lengths different from the average value of the voice sentence lengths calculated by the average calculation unit 6 by a predetermined value or less. The repetition generation unit 8 may finally select the response sentence candidate including more dependency words or including a preset dependency word from among the selected response sentence candidates. By doing so, it is possible to select the response sentence candidate having the appropriate sentence length according to the average value of the user's past voice sentence lengths and to finally select the response sentence candidate including the appropriate dependency word.

The repetition generation unit 8 uses the selected response sentence candidate as it is or processes the selected response sentence to generate the parrot-like response sentence. For example, the repetition generation unit 8 generates the parrot-like response sentence by adjusting a beginning or an end of the selected response sentence candidate. The repetition generation unit 8 may generate the parrot-like response sentence by adding a preset additional word at the beginning or the end of the selected response sentence candidate. More specifically, the repetition generation unit 8 may add pre-set additional words "so" and "you" at the beginning of the selected response sentence candidate "dropped money" to generate the parrot-like response sentence "so you dropped money". This diversifies the parrot-like response sentence and makes the dialogue more natural.

The repetition generation unit 8 outputs the generated parrot-like response sentence to the user, for example, using a speaker. Note that the repetition generation unit 8 may output the generated parrot-like response sentence to the user by, for example, displaying it on a display apparatus.

Next, a voice dialogue method according to the first embodiment will be described. FIG. 2 is a flowchart showing an example of a flow of the voice dialogue method according to this embodiment.

The storage unit 5 stores the string information of the user's past voice which has been subjected to the voice recognition processing by the voice recognition unit 2 (Step S101). The average calculation unit 6 calculates the average value of the user's voice sentence lengths based on the string information of the user's past voices stored in the storage unit 5 and outputs the average value to the repetition generation unit 8 (Step S102).

The voice recognition unit 2 performs the voice recognition processing based on the user's voice information acquired by the microphone or the like, converts the user's voice information into text and recognizes it as the string information, and outputs the recognized user's voice information to the structure analysis unit 3 (Step S103).

The structure analysis unit 3 performs morphological analysis on the string information of the voice recognized by the voice recognition unit 2 and outputs a result of the analysis of the string information to the dependency analysis unit 4 (Step S104). The dependency analysis unit 4 analyzes the dependency relation of the string information based on the result of the analysis of the string information output from the structure analysis unit 3, and outputs the analyzed dependency relation to the candidate generation unit 7 (Step S105).

The candidate generation unit 7 generates the plurality of response sentence candidates based on the dependency relation output from the dependency analysis unit 4 and outputs the generated plurality of response sentence candidates to the repetition generation unit 8 (Step S106).

The repetition generation unit 8 selects one response sentence candidate from among the plurality of response sentence candidates generated by the candidate generation unit 7 in association with the average value of the voice sentence lengths calculated by the average calculation unit 6 (Step S107).

The repetition generation unit 8 uses the selected response sentence candidate as it is or processes the selected response sentence to generate the parrot-like response sentence (Step S108). The repetition generation unit 8 outputs the generated parrot-like response sentence to the user, for example, using the speaker (Step S109).

As described above, the voice dialogue apparatus 1 according to the first embodiment includes the storage unit 5 that stores the user's past voice, the average calculation unit 6 that calculates the average value of the user's voice sentence lengths based on the user's past voice stored in the storage unit 5, the candidate generation unit 7 that combines the dependency word, which establishes the dependency relation with the noun included in the acquired user's voice, with the noun to generate the plurality of response sentence candidates, and the repetition generation unit 8 that selects, in association with the average value of the voice sentence lengths which is calculated by the average calculation unit 6, one response sentence candidate from among the plurality of response sentence candidates generated by the candidate generation unit 7 and uses the selected response sentence candidate as it is or processes the selected response sentence candidate to generate the parrot-like response sentence.

The voice dialogue apparatus 1 according to the first embodiment can generate the parrot-like response sentence having the appropriate sentence length according to the average sentence length of the user's past voices. Therefore, the voice dialogue apparatus according to the first embodiment can generate the parrot-like response sentence having the sentence length according to the user's voice.

Second Embodiment

In a second embodiment of the present disclosure, the repetition generation unit 8 selects a response sentence candidate including a preset number of dependency words from among the plurality of response sentence candidates generated by the candidate generation unit 7. The repetition generation unit 8 then adds the dependency word to the selected response sentence candidate or deletes the dependency word from the selected response sentence candidate to generate a final response sentence candidate so that the sentence length of the response sentence candidate becomes close to the average value of the voice sentence length calculated by the average calculation unit 6. The repetition generation unit 8 uses this final response sentence candidate as it is or processes this final response sentence to generate the parrot-like response sentence. The number of dependency words is set in the storage unit 5 or the like.

For example, suppose that the preset number of dependency words is one. In this case, the repetition generation unit 8 selects the response sentence candidate "dropped precious money" that includes one dependency word "precious" from among the plurality of response sentence candidates "dropped precious money", "dropped money earned by working", and "dropped precious money earned" that are generated by the candidate generation unit 7. The repetition generation unit 8 then adds the dependency word "earned" to the selected response sentence candidate "dropped precious money" so that the number of characters of the final response sentence candidate becomes close the average value of the number of characters in the voice which is calculated by the average calculation unit 6 to thereby generate the final response sentence candidate "dropped precious money earned". Alternatively, the repetition generation unit 8 deletes the dependency word "precious" from the selected response sentence candidate "dropped precious money" so that the number of characters of the final response sentence candidate becomes close to the average value of the number of characters in the voice which is calculated by the average calculation unit 6 to thereby generate the final response sentence candidate "dropped money".

As described above, the repetition generation unit 8 according to the second embodiment selects the response candidate including the set optimum number of dependency words. Further, the repetition generation unit 8 adaptively makes an adjustment by increasing or decreasing the number of dependency words of the selected response sentence candidate so that the sentence length of the selected response sentence candidate becomes close to the average value of the user's past voice sentence length. In this manner, the parrot-like response sentence having the appropriate sentence length corresponding to the average sentence length of the user's past voices can be generated. That is, the parrot-like response sentence having the sentence length corresponding to the user's voice can be generated.

In the second embodiment, the components other than the repetition generation unit 8 are substantially the same as those in the first embodiment. Thus, the same components are denoted by the same signs, and detailed descriptions thereof will be omitted.

Although some embodiments of the present disclosure have been described, these embodiments have been presented merely as examples and are not intended to limit the scope of the present disclosure. These novel embodiments can be implemented in various forms other than those described above. Various omissions, substitutions, and changes can be made without departing from the spirit of the present disclosure. These embodiments and modifications of the embodiments are included in the scope and the spirit of the present disclosure and included in the present disclosure described in claims and a scope of equivalents of the present disclosure.

The present disclosure can also be achieved, for example, by causing the CPU to execute a computer program that performs processes shown in FIG. 2.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM. RAM (random access memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A voice dialogue apparatus for analyzing an acquired user's voice, generating a parrot-like response sentence for repeating the acquired user's voice based on a result of the analysis, and outputting the generated parrot-like response sentence, the voice dialogue apparatus comprising:
storage means for storing a user's past voice;
average calculation means for calculating an average value of voice sentence lengths each indicating a length of the user's voice based on the user's past voice stored in the storage means;
candidate generation means for combining a dependency word, which establishes a dependency relation with a noun included in the acquired user's voice, with the noun to generate a plurality of response sentence candidates; and
repetition generation means for selecting, in association with the average value of the voice sentence lengths which is calculated by the average calculation means, one response sentence candidate from among the plurality of response sentence candidates generated by the candidate generation means and using the one selected response sentence candidate as it is or processing the one selected response sentence candidate to generate the parrot-like response sentence.

2. A voice dialogue apparatus for analyzing an acquired user's voice, generating a parrot-like response sentence for repeating the acquired user's voice based on a result of the analysis, and outputting the generated parrot-like response sentence, the voice dialogue apparatus comprising:
storage means for storing a user's past voice;
average calculation means for calculating an average value of voice sentence lengths each indicating a length of the user's voice based on the user's past voice stored in the storage means;
candidate generation means for combining a dependency word, which establishes a dependency relation with a noun included in the acquired user's voice, with the noun to generate a plurality of response sentence candidates; and
repetition generation means for selecting the response sentence candidate including a preset number of dependency words from among the plurality of response sentence candidates generated by the candidate generation means, adding a dependency word to the selected response sentence candidate or deleting the dependency word from the selected response sentence candidate to generate a final response sentence candidate so that a sentence length of the final response sentence candidate becomes close to the average value of the voice sentence lengths calculated by the average calculation means, and using the final response sentence candidate as it is or processing the final response sentence candidate to generate the parrot-like response sentence.

3. The voice dialogue apparatus according to claim 1, wherein the repetition generation means selects the response sentence candidate having the voice sentence length closest to the average value of the voice sentence length calculated by the average calculation means from among the plurality of response sentence candidates generated by the candidate generation means.

4. The voice dialogue apparatus according to claim 1, wherein the candidate generation means extracts a predicate term included in the acquired user's voice and concatenates at least one dependency word, which establishes the dependency relation with the noun included in the extracted predicate term, to the extracted predicate term to generate a plurality of patterns of the plurality of response sentence candidates.

5. The voice dialogue apparatus according to claim 1, wherein the repetition generation means generates the parrot-like response sentence by adding a preset additional word to the selected one response sentence candidate.

6. A voice dialogue method for analyzing an acquired user's voice, generating a parrot-like response sentence for repeating the acquired user's voice based on a result of the analysis, and outputting the generated parrot-like response sentence, the voice dialogue method comprising:
- storing a user's past voice;
- calculating an average value of voice sentence lengths each indicating a length of the acquired user's voice based on the stored user's past voice;
- combining words included in the acquired user's voice to generate a plurality of response sentence candidates; and
- selecting, in association with the calculated average value of the voice sentence lengths, one response sentence candidate from among the generated plurality of response sentence candidates and using the one selected response sentence candidate as it is or processing the one selected response sentence candidate to generate the parrot-like response sentence.

7. Non-transitory computer readable media stored a program for analyzing an acquired user's voice, generating a parrot-like response sentence for repeating the acquired user's voice based on a result of the analysis, and outputting the generated parrot-like response sentence, the program causing a computer to execute:
- a process of calculating an average value of voice sentence lengths each indicating a length of the acquired user's voice based on the stored user's past voice;
- a process of combining a dependency word, which establishes a dependency relation with a noun included in the acquired user's voice, with the noun to generate a plurality of response sentence candidates; and
- a process of selecting, in association with the calculated average value of the voice sentence lengths, one response sentence candidate from among the generated plurality of response sentence candidates and using the one selected response sentence candidate as it is or processing the one selected response sentence candidate to generate the parrot-like response sentence.

* * * * *